Jan. 19, 1960  R. S. PETERSON  2,922,094
MOTOR CONTROL APPARATUS FOR DYNAMIC BRAKING
Filed July 10, 1956  5 Sheets-Sheet 5

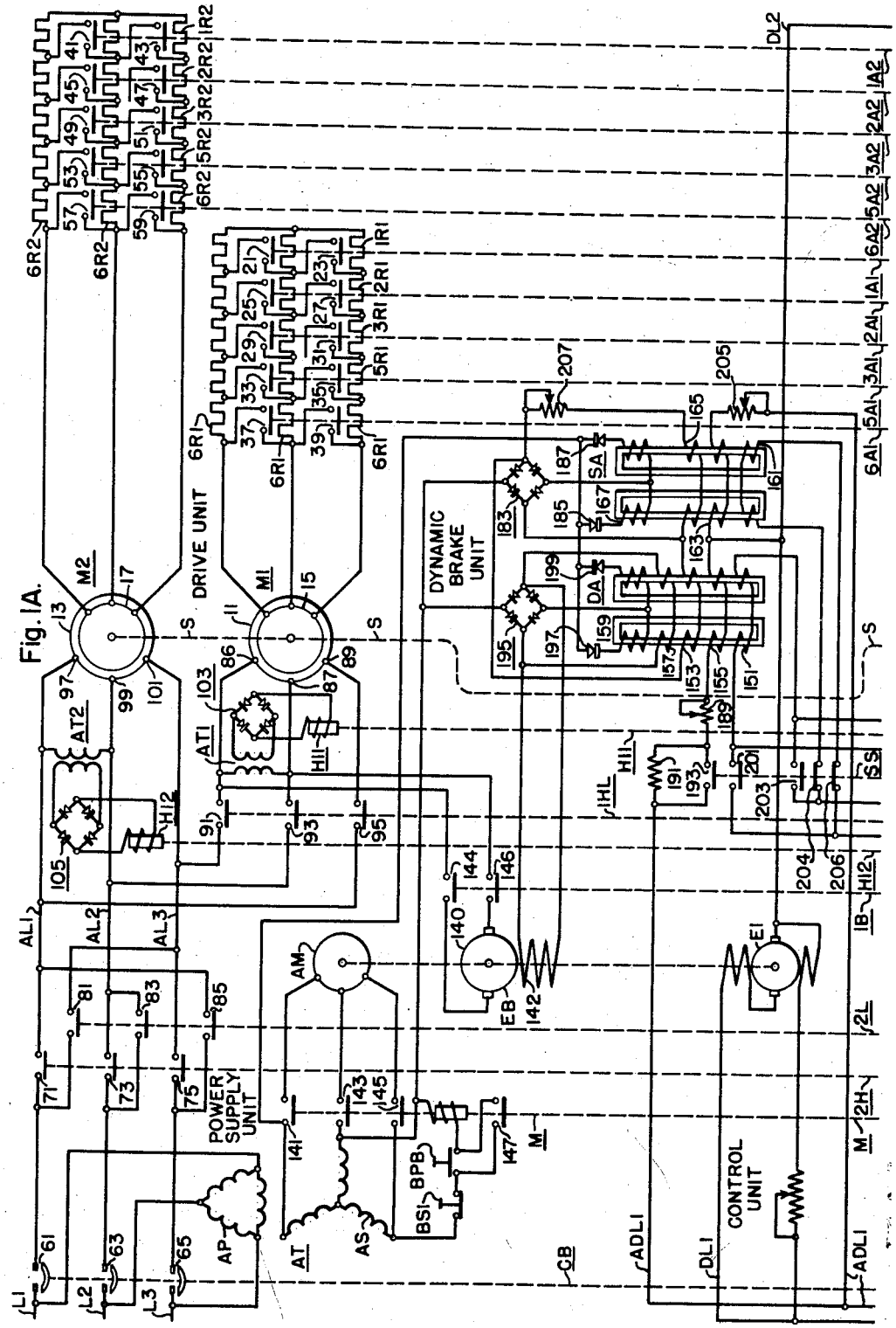
Fig. IA.

United States Patent Office 2,922,094
Patented Jan. 19, 1960

2,922,094

MOTOR CONTROL APPARATUS FOR DYNAMIC BRAKING

Robert S. Peterson, McKeesport, Pa., assignor to Westinghouse Electric Corporation, East Pittsburgh, Pa., a corporation of Pennsylvania Application July 10, 1956, Serial No. 596,946

18 Claims. (Cl. 318—50)

The invention relates to control apparatus and has particular relation to apparatus for controlling the operation of hoist motors.

While this invention is in its broader aspects applicable to the movement of a load of any type from an initial position to a final position, in its specific aspects this invention concerns itself with mine hoists. In mine hoists a pair of skips or a skip and a counterweight or even a single skip are adapted to be moved by a drive unit. Either or both skips or the single skip may be loaded. In moving the skips from their initial positions to their final positions, it is desirable that the skips be moved at a relatively high speed from the initial positions to intermediate positions near the final positions. At this point it is desirable that the speed be reduced at a relatively constant rate to a relatively low so-called landing speed and thereafter the movement continue at the landing speed until the skips reach the final positions.

One phase of the prior art is typified by a Pell Patent 2,467,986 and a Transaction Paper by Myles, a photostat of which is attached to an amendment filed herewith, which was submitted for delivery at meetings of the American Institute of Electrical Engineers between January 30 and February 3, 1956. But with these drives, the above-described speed pattern with the necessary smooth transition from the higher speed to the lower speed has not been attainable.

Another phase of the prior art is typified by drives, such as those in the elevator field, in which the motor is driven by a generator and the excitation of the generator is varied. Such drives are excessively costly.

It is accordingly broadly an object of this invention to provide a smoothly operating drive of moderate cost particularly suitable for mine hoists, for moving a load, from an initial position to a final position in the operation of which the load shall be moved from the initial position to an intermediate position at a predetermined relatively high speed, and thereafter the speed shall be reduced to a low-magnitude landing speed at which the final position shall be approached.

A specific object of this invention is to provide a novel method of operating a drive including a pair of motors for moving a load from an initial position to a final position.

An ancillary object of this invention is to provide a novel motor control system.

A further ancillary object of this invention is to provide a novel magnetic amplifier system.

This invention arises from the realization that the difficulty with the prior art typified by the Pell patent and the Myles article is that in these drives regulation or control is effected in steps in the regions where the speed is to be regulated or controlled, and thus the load speed does not have the desired uniform characteristic. In accordance with this invention, the speed is maintained with high precision at the desired magnitude by continuous regulation or control of the drive. To achieve this purpose braking is applied to the drive when the speed is to be reduced and the magnitude of the braking effect is varied in dependence upon the deceleration of the load to regulate the deceleration so long as the speed of the load is being reduced to the landing speed and is then varied in dependence upon the speed of the load to regulate the speed until the load reaches the final position. The regulation by varying the braking effect is continuous, and thus the speed is controlled continuously and not in steps.

In accordance with this invention in its specific aspects the load is moved by a pair of motors in tandem, each of the motors having variable resistance in circuit with its armature and one of the motors being provided with dynamic braking means which is normally disconnected therefrom. To start movement of the load from the initial position, both motors are energized in the usual manner. As the load is moved the speed of the motors is increased by reducing the resistance in circuit with their armatures. When the load reaches the intermediate position, the resistance in the armature circuit of one of the motors is increased, the other motor is disconnected from the supply and, if necessary, resistance is added in its armature circuit after the latter motor is so disconnected and the dynamic braking mechanism is connected thereto. The magnitude of the braking force applied by the dynamic braking mechanism is controlled initially in inverse dependence on the deceleration of the load. This mode of control regulates the deceleration and is applied until the speed of the load is reduced to the landing speed. Thereafter the braking force is controlled in dependence upon the speed of the load in such manner that the speed is maintained substantially constant until the load is in its final position.

Specifically, the dynamic braking mechanism is an exciter and the magnitude of the applied braking effect is controlled by varying the magnitude of the current flowing through its field. This control is effected through a pair of magnetic amplifiers which are controlled from a tachometer connected to the drive motors. One of the amplifiers has a main input winding and an auxiliary input winding and an output winding. The other amplifier has an input winding and an output winding. The main input winding is supplied from the tachometer through a differentiating transformer or other differentiating network such as a capacitor-resistor network so that the current conducted through it and thus its field is proportional to the deceleration of the drive. The auxiliary input winding is controlled from the output winding of the other amplifier. The output winding of the first amplifier is connected to control the current supplied to the exciter field. The input winding of the other amplifier is directly connected to the tachometer so that it is controlled in dependence upon the speed of the load.

The two magnetic amplifiers are so related that so long as the speed of the load is above the landing speed, the deceleration signal (in the main input winding) is overriding and the exciter is controlled in accordance with this signal. But, when the landing speed is reached the signal (in the auxiliary input winding) from the speed responsive amplifier is over-riding and this signal maintains the speed of the load at the landing speed magnitude.

The novel features considered characteristic of this invention are described generally above. The invention itself, both as to its organization and as to its method of operation, together with additional objects and advantages thereof, will be understood from the following description of a specific embodiment when read in connection with the accompanying drawings, in which:

Figures 1A, 1B and 1C, together constitute a circuit diagram of a preferred embodiment of this invention;

Description

Figure 1B:
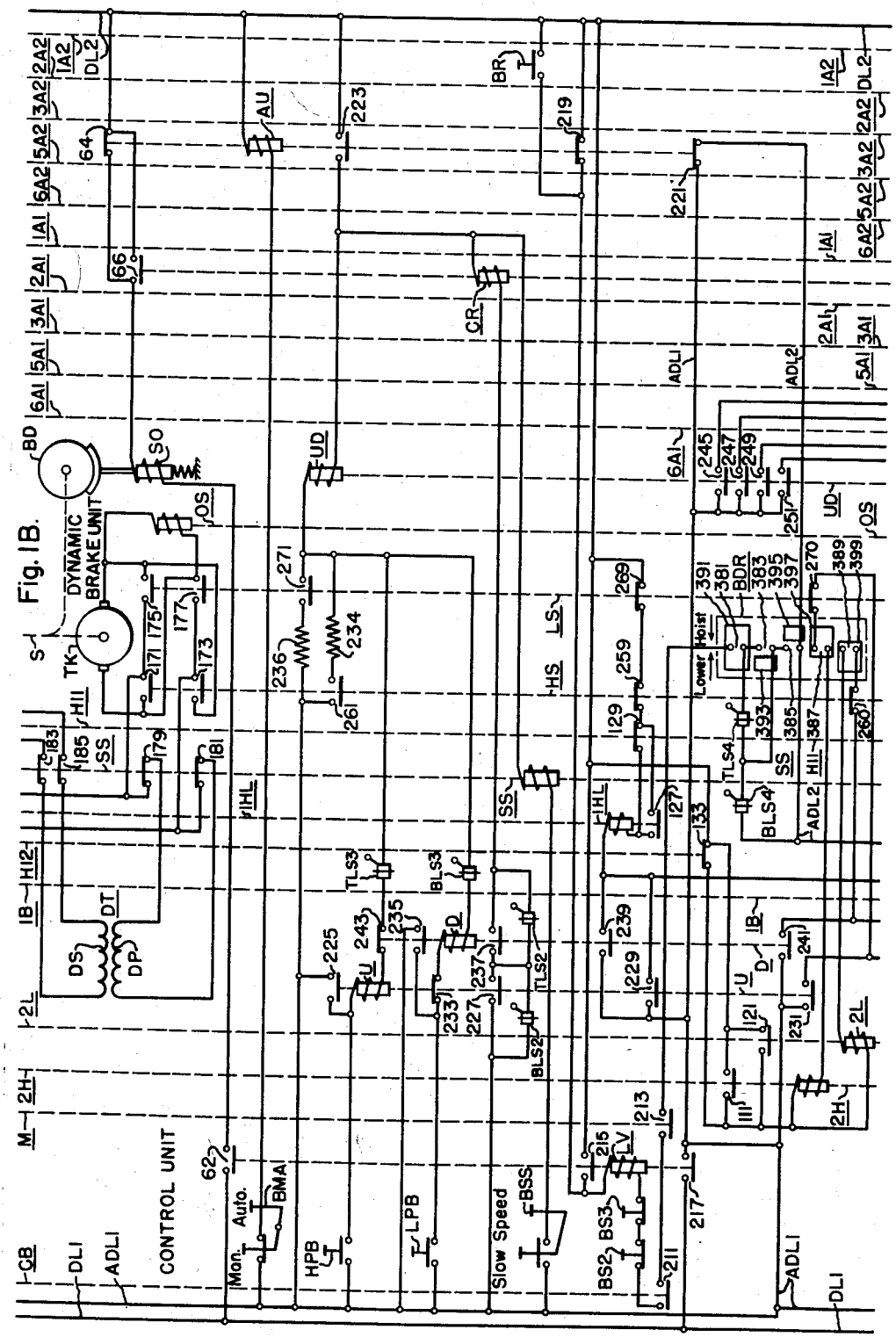
Figure 1C:
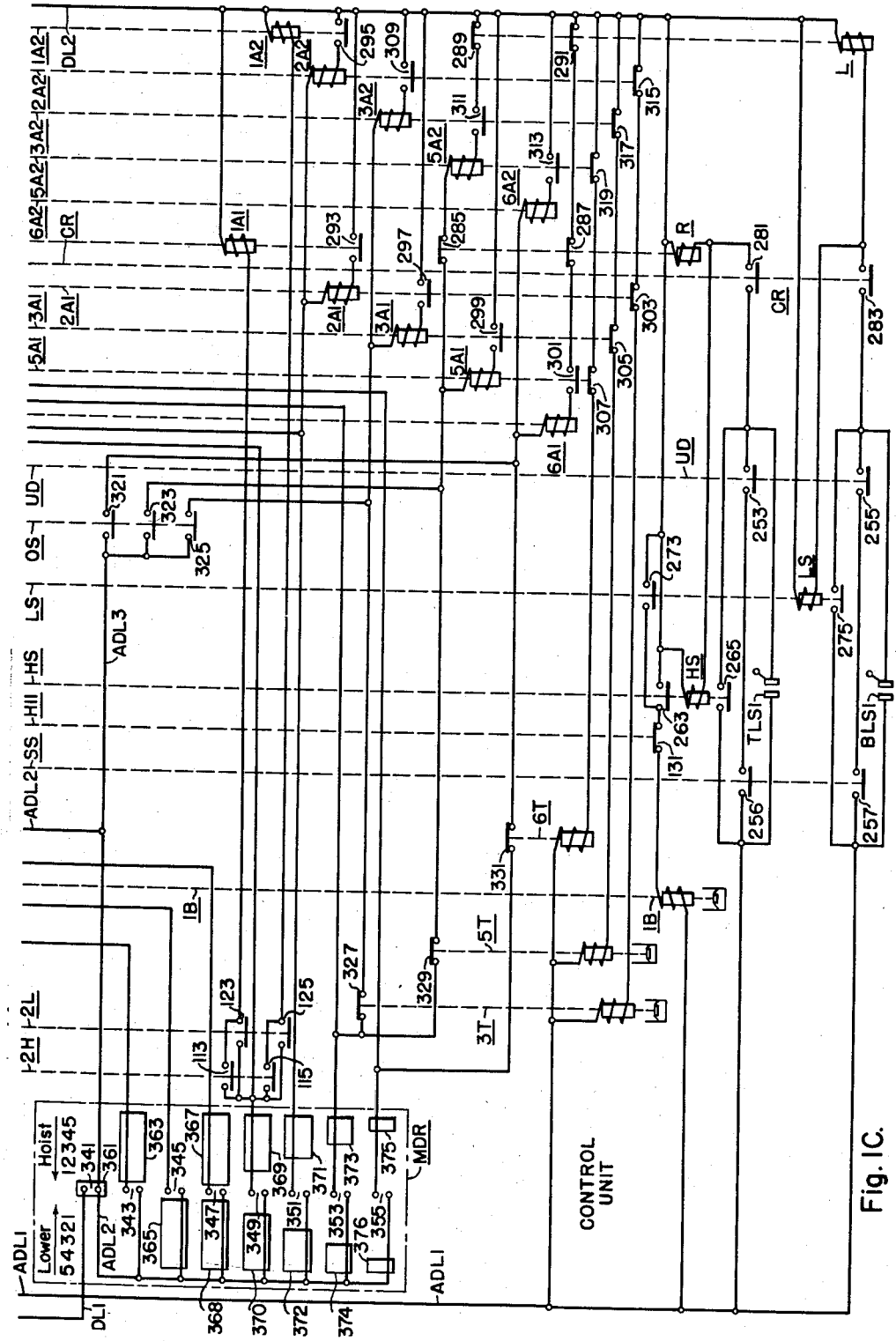

The apparatus shown in Figs. 1A through 1C may be subdivided as to function into a Drive Unit, a Power Supply Unit, a Dynamic Brake Unit, and a Control Unit. These units are identifiable principally with respect to the function performed by each and not with respect to their actual position in the concrete apparatus or on the circuit diagram. This apparatus is supplied from the conductors L1, L2, L3 which are connected through the usual disconnects (not shown) to a commercial three-phase supply of the 220 or 440 volt 60-cycle type. Power for the Control Unit is preferably of the direct-current type and is derived from the conductors DL1 and DL2 which may be energized from an exciter E1 driven from an auxiliary alternating-current motor AM which is itself energized from the conductors L1, L2 and L3 through a transformer AT having a primary AP and a secondary AS.

The Drive Unit includes a pair of three-phase motors M1 and M2, each motor having a field winding 11 and 13 and an armature 15 and 17. The armatures of the motors M1 and M2 are coupled together through a common shaft S through which the load (not shown) is driven. A plurality of resistors 1R1 through 6R1 and 1R2 through 6R2 are connected in a network to the terminals of each of the armatures 15 and 17, respectively. These resistors 1R1 through 6R2 are adapted to be shunted out in succession by the contacts 21 through 59 of a plurality of contactors 1A1, 2A1, 3A1, 5A1 and 6A1 and 1A2, 2A2, 3A2, 5A2 and 6A2, respectively, in the Control Unit.

The motors M1 and M2 include a drum brake unit BD connected to their common shaft S and releasable by energization of a brake solenoid SO. The solenoid SO is adapted to be connected between the conductors DL1 and DL2 through a normally open contact 62 of a relay LV in the Control Unit and alternatively through the normally closed contact 64 of the relay AU or the normally open contact 66 of the relay CR, both in the Control Unit.

The Drive Unit also includes a tachometer which may be of the direct-current type connected or coupled to the common shaft S of the motors M1 and M2. The output of this tachometer TK varies in magnitude in accordance with the speed of the shaft S and its voltage is thus proportional to the speed of the load. The tachometer TK is connected directly across the coil of an overspeed relay OS in the Control Unit. This relay OS is actuated when the shaft S is at an excessive speed because the load is excessively overhauling.

The Power Supply Unit includes in addition to the motor AM, the exciter E1 and the transformer AT, a plurality of conductors AL1, AL2, AL3 which are adapted to be energized from the conductors L1, L2 and L3 through the contacts 61, 63, 65 of a circuit breaker CB and through the contacts 71, 73, 75 or 81, 83, 85 of contactors 2H or 2L, depending on whether it is desired that the motors M1 and M2 operate in the hoisting or in the lowering direction, respectively. These conductors AL1, AL2, AL3 are connected to the supply terminals 86, 87, 89 of the motor M1 through the contacts 91, 93, 95 of a contactor 1HL and directly to the supply terminals 97, 99, 101 of the motor M2. The Power Supply Unit also includes a pair of relays H11 and H12. The coil of relay H11 is adapted to be energized by the voltage across a pair of the terminals 86 and 87 of the motor M1 through a transformer AT1 and a rectifier 103 and the coil of relay H12 is adapted to be energized by the voltage across two of the terminals 97 and 99 of the motor M2 through another transformer AT2 and a rectifier 105. The contactors 2H and 2L each has, in addition to the contacts 71, 73, 75 and 81, 83, 85, respectively, a plurality of auxiliary normally open contacts 111, 113, 115 and 121, 123, 125 respectively which operate in the Control Unit. The contactor 1HL also has an additional normally open contact 127 which operates in the Control Unit. The relay H11 has a pair of normally closed contacts 129 and 131 and the relay H12 has a normally closed contact 133.

The Power Supply Unit also includes the contactor M having normally open contacts 141, 143, 145 between secondary AS and motor AM and a normally open lock-in contact 147. The coil of contactor M may be connected across a pair of the terminals of secondary AS by closing a push button BPB.

The Dynamic Brake Unit includes an exciter EB driven by the motor AM and a deceleration and speed response amplifier which is of the magnetic type. The exciter EB has an armature 140 and a field winding 142. The armature 140 is adapted to be connected across two of the terminals 86 and 87 of the motor M1 through the normally open contacts 144 and 146 of a relay 1B in the Control Unit. The field winding 142 is connected to be energized from the deceleration and speed responsive amplifier.

The deceleration and speed responsive amplifier includes a differentiating transformer DT, a deceleration amplifier DA, and a speed limit amplifier SA. The differentiating transformer has a primary DP and a secondary DS and is so constructed that when the potential is impressed on its primary DP the current delivered by its secondary is proportional to the first differential of the primary potential. The deceleration amplifier DA has main input windings 151, auxiliary input windings 153, pattern setting windings 155, feedback windings 157 and output windings 159. The speed limit amplifier SA has input windings 161, bias windings 163, feedback windings 165 and output windings 167.

The tachometer TK is adapted to be connected through the normally open contacts 171, 173, or 175, 177 of the relays HS or LS, in the Control Unit and through normally closed contacts 179, 181 of a relay SS in the Control Unit across the primary DP. The secondary DS is connected to the main control windings 151 of the amplifier DA through normally closed contacts 183, 185 of relay SS. The output windings 167 of the amplifier SA are supplied from two of the terminals of secondary AS and are connected in series with this supply to the auxiliary input windings 153 through a full wave rectifier 183 and through a pair of rectifiers 185 and 187 so poled as to produce a self-saturating effect in the amplifier SA. The pattern setting windings 155 are supplied from the conductors DL1 (through conductor ADL1) and DL2 through a variable resistor 189 and a fixed resistor 191 which may be shunted out by the normally open contacts 193 of the relay SS. The resistor 189 serves to set the current flow through the pattern setting windings at a magnitude such that the desired speed pattern is achieved. The output windings 159 of the amplifier DA are supplied from the same two terminals of AS as the windings 167 and are connected with this supply through a full-wave rectifier 195 and through rectifiers 197 and 199, connected to produce self-saturation of the amplifier, to the field winding of the exciter EB. The feedback windings 157 are connected across the terminals of the full-wave rectifier 195.

The tachometer TK is also adapted to be connected directly to the main input windings 151 of the amplifier DA through the normally open contacts 171, 173 or 175, 177 of the relays HS or LS, and through normally open contacts 201 and 203 of the relay SS. Under such circumstances the differentiating transformer is entirely disconnected from the tachometer.

The input windings 161 of the amplifier SA are adapted to be connected across the tachometer TK through the normally open contacts 171, 173 or 175, 177 of the relays HS or LS and through normally closed contacts 204, 206 of the relay SS. The biasing windings of the amplifier SA are supplied from the conductors DL1 (through conductor ADL1) and DL2 through a variable resistor 205 which is set to produce the desired biasing effect. The feedback windings are connected across the terminals of the rectifier 183 through a variable resistor 207.

Figure 3:
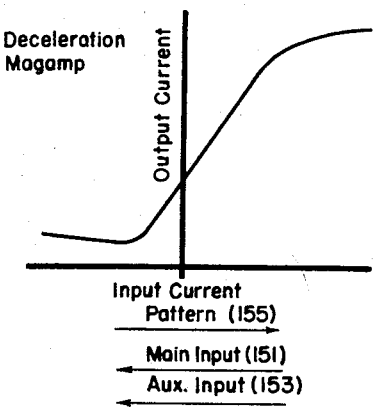
Fig. 3 is a graph showing the characteristic of the magnetic amplifier responsive to the deceleration of the load.

The characteristic of the deceleration amplifier DA is shown in Fig. 3 in which the output current is plotted vertically and the controlling current flowing through the various windings (151, 153, 155) is plotted horizontally. The effect of an increase in the magnitude of the current in each of the controlling windings 151, 153, 155 is indicated by an arrow. Thus, an increase in the pattern setting current (155) results in an increase in the output current of the amplifier DA, while an increase in the current flow through either the main input windings 151 or the auxiliary input windings 153 counteracts the pattern setting current and results in a decrease in the output of the amplifier DA.

The characteristic of the speed limit amplifier SA is plotted in Fig. 4, in which again the output current is plotted vertically and the control current is plotted horizontally. In this case the effects on the output current of the currents in the controlling windings 161, 163 are again indicated by arrows. The bias current causes the output of the amplifier SA to increase as it increases and the current in the input winding 161 causes the output of the amplifier SA to decrease as it increases.

Figure 4:
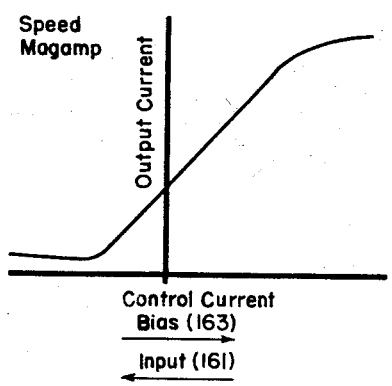
Fig. 4 is a graph showing the characteristic of the magnetic amplifier responsive to the speed of the load.

From a study of Figs. 3 and 4, it will be understood that with the tachometer TK connected to the amplifier SA and the output of the tachometer at a predetermined high magnitude (that is, the speed of the load at a predetermined high magnitude), the tachometer reduces the output of the amplifier SA to a low magnitude and therefore the current through the auxiliary input windings 153 is low. Under such circumstances, the effect of the amplifier SA on the amplifier DA may be negligible and the amplifier DA may then be controlled alone from the main input windings 151. If the tachometer TK is then connected to the main input windings through the differentiating transformer DT, the control is dependent on the deceleration of the load. Thus with the speed of the load above a predetermined magnitude, the deceleration signal is over-riding and may serve to regulate the deceleration of the load. When the load approaches a speed of a predetermined low magnitude, the output of the tachometer TK is relatively low, the output of the amplifier SA is then relatively high and the supply of controlling current to the auxiliary input winding is high. Under such circumstances the speed signal derived from the amplifier SA may be over-riding. The effect of this latter signal is to regulate the speed during landing.

The Control Unit includes the above-mentioned contactors 2H, 2L, 1HL and M and relays LV, 1B, HS, LS, OS, CR and AU and the relays 1A1 through 6A1 and 1A2 through 6A2. In addition, the Control Unit includes the relays U, D and UD, the timing relays 3T, 5T, 6T and the relays L and R. The timing relays 3T through 6T are of the type which when energized open their contacts instantaneously but when deenergized close their contacts only after a predetermined delay. Further, the Control Unit includes in addition to the push button BPB, the manual-automatic button BMA, normally open push buttons HPB and LPB, for starting a hoisting or lowering operation, normally open reset button BR, and a push button BSS which may be actuated to set the apparatus for slow speed operation when the apparatus is to be inspected. In addition, there are a number of stop buttons BS1, BS2 and BS3 for opening various circuits when an emergency arises.

The Control Unit also includes normally open limit switches BLS1 and TLS1 which are closed when the load reaches the respective bottom and top intermediate positions (assuming a vertical load) at which the reduction in speed is to start, the normally closed limit switches BLS2, TLS2, BLS3 and TLS3 which are opened at the respective opposite landing positions of the load and the normally closed limit switches BLS4 and TLS4 which are opened when the load over-runs either of its respective opposite landing positions. The switches BLS1 and TLS1 are of the instantaneous type closing only for a short time interval when the load passes through the intermediate position. The switches BLS2 through BLS4 and TLS2 through TLS4 remain open only so long as the load is in the landing position or in the over-run positions as the case may be. In addition, the Control Unit includes a master controller drum switch MDR for manual operation of the operation of the apparatus and a back-out drum switch BDR.

The Control Unit includes a plurality of auxiliary conductors ADL1 and ADL2. Conductor ADL1 is energized from DL1 through the resetting contact 341 of the switch MDR, conductor ADL2 and normally closed contact 221 when the apparatus is set for manual operation. Conductor ADL1 is also adapted to be energized from conductor DL1 through normally open contact 217 of relay LV. Conductor ADL2 is energized from conductor DL1 through the resetting contact 341 when the apparatus is set for manual operation. Conductor ADL3 is energized from conductor DL1 through the resetting contacts 341. When the apparatus is set for manual operation, conductors ADL2 and ADL3 are also adapted to be energized through normally open contact 217 and normally closed contact 221. The circuit breaker CB has, in addition to its contacts 61, 63, 65, a normally open contact 211 and the contactor M in addition to its contacts 141, 143, 145, 147 a normally open contact 213. The relay LV has, in addition to its contact 62, normally open contacts 215, 217. The relay AU has in addition to the normally closed contacts 64 in series with the brake solenoid SO, normally closed contacts 219 and 221 and a normally open contact 223.

The relay U has a normally open contact 225 across the push button HPB, a normally open contact 227 across BLS2 and normally open contacts 229 and 231 and a normally closed contact 233. The relay D has a normally open contact 235 across the button LPB, a normally open contact 237 across TLS2 and normally open contacts 239 and 241 and a normally closed contact 243. The relay UD has a plurality of normally open contacts 245, 247, 249, 251, 253, 255.

Relay SS has in addition to the contacts 179 through 204 normally open contacts 256 and 257, relay HS in addition to contacts 171 and 173 has normally closed contacts 259 and 260 and normally open contacts 261, 263, 265, and relay LS in addition to contacts 175 and 177 has normally closed contacts 269 and 270 and normally open contacts 271, 273, 275. Relay CR has in addition to contact 66, normally open contacts 281 and 283. Relay R has normally closed contacts 285 and 287 and relay L normally closed contacts 289 and 291. Relays 1A1 and 1A2 have in addition to their contacts 21 and 23 and 41 and 43 normally open contacts 293 and 295, respectively. Relays 2A1, 3A1 and 5A1 have in addition to their contacts 25 through 35, respective normally open contacts 297, 299, 301 and respective normally closed contacts 303, 305, 307. Relays 2A2, 3A2, and 5A2 have in addition to their contacts 45 through 55 respective normally open contacts 309, 311, 313 and normally closed contacts 315, 317, 319. Relay OS has normally open contacts 321, 323, 325 and relays 3T, 5T, 6T each has a normally closed contact 327, 329, 331.

The controller MDR is adapted to be set manually in a plurality of hoist positions and a plurality of lower positions labeled 1 through 5. The direction of movement of the controller for setting in the hoist or lower positions is indicated by arrows. The controller MDR includes a plurality of contacts 341, 343, 345, 347, 349, 351, 353, 355 and a plurality of segments 361, 363, 365, 367, 368, 369, 370, 371, 372, 373, 374, 375, 376 for closing the contacts in the different positions.

The back-out switch BDR is manually actuable to return the load to its opposite landing positions if it has at any time over-run. Thus switch BDR may be moved either to hoist or lower positions as indicated by arrows, to the former when the load has over-run its lower position and to the latter when the load has over-run its upper position. The switch BDR includes a plurality of contacts 381, 383, 385, 387, 389, which are closed or adapted to be closed by segments 391, 393, 395, 397, 399 in the positions of the switch.

The coil of relay AU is adapted to be connected between conductors ADL1 and DL2 through the button BMA when the latter is in the automatic position. When button BMA is in the manual position the circuit through the coil of relay AU is open. The coil of the relay U is adapted to be connected in series with the coil of the relay UD between conductors ADL1 and DL2 through push button HPB, a normally closed contact 243 of the relay D, limit switch TLS3, and a normally open contact 223 of relay AU. The coil of the relay D is adapted to be connected in series with the coil of relay UD between conductors ADL1 and DL2 through the push button LPB, the normally closed contact 233 of the relay U and limit switch BLS3 and contact 233. The coil of relay UD is also adapted to be connected between the conductors ADL1 and DL2 through normally open contacts 261 or 271 of relays HS or LS, associated resistors 234 or 236, and the normally open contact 223 of relay AU. The relay SS is adapted to be connected between the conductors ADL1 and DL2 through the push button BSS when it is closed for slow speed and the normally open contact 223 of the relay AU.

The coil of relay LV is adapted to be connected between conductors DL1 and DLT through the normally closed neutral contact 341 of the master controller, limit switches BLS4 and TLS4, normally closed neutral contact 381 of the back-out switch BDR, normally open contacts 213 of contactor M, normally open contacts 211 of breaker CB, normally closed emergency buttons BS2 and BS3 and either the push button BR or the normally closed contacts 219 of the relay AU when the latter is set for automatic operation. The relay LV may be locked in independently of BR or 219 by its contact 215. When limit switch TLS4 is open, the coil of relay LV may also be connected between the conductors DL1 and DL2 through the normally closed neutral contact 381 of the master controller and through the contact 383 of the back-out switch BDR which is closed when the latter is set in the lower position. When the limit switch BLS4 is open, the coil of the relay LV may also be connected between the conductors DL1 and DL2 through the neutral contact 281 of the master controller and through the contact 385 of the back-out switch which is closed with the back-out switch set in the hoist position.

The coil of relay CR is adapted to be connected between the conductors ADL1 and DL2 through limit switches BLS2 or TLS2 and 237 or 227, respectively (depending on the landing position of the load) and normally open contact 223 of the relay AU.

The coil of relay 2H is adapted to be connected between conductors ADL1 and DL2 through a normally open contact 231 of relay U, a normally closed contact 270 of relay LS, the contact 387 of the back-out switch in the neutral position and alternatively through a normally closed contact 133 of relay H12 or normally open contacts 111 or 121 of relays 2H or 2L. The coil of relay 2H is also adapted to be connected between conductors ADL2 and DL2 through contact 343 of the master controller MDR in hoist positions 1 through 5. The coil of relay 2L is similarly adapted to be connected between conductors ADL1 and DL2 through the normally open contact 241 of relay D, normally closed contact 260 of HS, contact 389 of the back-out switch in the neutral position and the three alternative contacts 133, 111 and 121. The relay 2L is further adapted to be connected between conductors ADL2 and DL2 in lower positions 1 through 5 through the contact 345 of the master controller MDR.

The coil of relay 1HL is adapted to be connected between conductors ADL1 and DL2 alternatively through normally open contacts 239 or 229 of relays D or U, normally closed contact 129 of relay H11, normally closed contact 259 of relay HS, and normally closed contact 209 of relay LS. Normally closed contact 129 of H11 may be shunted through normally open contact 127 of relay 1HL. Relay 1HL is also adapted to be connected between conductors ADL2 and DL2 through contact 347 in hoist and lower positions 1 through 5 of the master controller MDR. The coils of relays 1A1 and 1A2 are adapted to be connected between conductors ADL1 and DL2 through a normally open contact 251 of relay UD and alternatively through normally open contacts 113 and 123 or 115 and 125 of relays 2H and 2L, respectively. The coils of relays 1A1 and 1A2 are also adapted to be connected between conductors ADL2 and DL2 through a contact 349 of the master controller MDR in hoist and lower positions 2 through 5. The coils of relays 2A1 and 2A2 are adapted to be connected between conductors ADL1 and DL2 through a normally open contact 249 of relay UD and respective normally open contacts 293 and 295 of relays 1A1 and 1A2. The coils of relays 2A1 and 2A2 are similarly adapted to be connected between conductors ADL2 and DL2 through the master controller contact 351 in hoist and lower positions 3 through 5. The coils of relays 3A1 and 3A2 are adapted to be connected between conductors ADL1 and DL2 through respective normally open contacts 297 and 309 of relays 2A1 and 2A2, the normally open contact 247 of relay UD and the normally closed contact 327 of relay 3T. The coils of relays 3A1 and 3A2 are also adapted to be connected between conductors ADL2 and DL2 through the contact 353 of the master controller MDR in positions 4 and 5. The coil of relay 5A1 is adapted to be connected between conductors ADL1 and DL2 through a normally open contact 247 of relay UD, normally closed contact 329 of relay 5T and normally open contact 299 of relay 3A1. The coil of relay 5A2 is also adapted to be connected between conductors ADL1 and DL2 through normally open contact 247 of relay UD, normally closed contact 329 of relay 5T, normally closed contacts 285 and 289 of relays R and L, and normally open contact 311 of relay 3A2. The coils of relays 5A1 and 5A2 are adapted to be connected through the master controller MDR in hoist and lower positions 4 and 5 through contact 353. The coil of relay 6A1 is adapted to be connected between conductors ADL1 and DL2 through normally open contact 245 of relay UD, normally closed contact 331 of relay 6T, normally closed contacts 287 and 291 of relays R and L and a normally open contact 301 of relay 5A1. The coil of relay 6A2 is adapted to be connected between conductors ADL1 and DL2 through the normally open contact 245 of relay UD, normally closed contact 331 of relay 6T and normally open contact 313 of relay 5A2.

The coil of relays 6A1 and 6A2 are adapted to be connected between conductors ADL2 and DL2 through the master controller in position 5 through contact 355.

The coils of relays 3A1 and 3A2 through 6A1 and 6A2 are all adapted to be connected to conductor ADL3 through normally open contacts 321, 323, 325 of relay OS. Thus, when an overspeed occurs and the tachometer TK delivers a high voltage and relay OS is actuated, relays 3A1 through 6A2 may be actuated if relays 1A1, 1A2, 2A1 and 2A2 are actuated, which would usually occur. Under such circumstances the resistance in the secondaries of motors M1 and M2 is short-circuited and the motors operate at synchronous speed, exerting a restraining force on the load.

The coils of relays R and HS are connected in parallel and these coils are adapted to be connected between conductors DL2 and ADL1 through a normally open contact 281 of relay CR and alternatively through the limit switch TLS1, the normally open contacts 256 and 253 of relays SS and UD, or lock-in contact 265 of relay HS. The coils of relays L and LS are connected in parallel and are adapted to be connected between conductors DL2 and ADL1 through a normally open contact 283 of relay CR and alternatively through normally opened limit switch BLS1, normally open contacts 257 and 255 of relays SS and UD or lock-in contact 275 of relay LS. The coil of relay 1B is adapted to be connected between conductors ADL1 and DL2 through normally closed contact 131 of relay H11 and alternatively normally open contacts 263 or 273 of relays HS or LS. The coil of relay 3T is connected between conductors ADL1 and DL2 through normally closed contacts 303 and 315 of relays 2A1 and 2A2. The coil of relay 5T is connected between conductors ADL1 and DL2 through the normally closed contacts 305 and 317 of relays 3A1 and 3A2. The coil of relay 6T is connected between conductors ADL1 and DL2 through normally closed contacts 307 and 319 of relays 5A1 and 5A2.

Standby

In the standby condition of the apparatus the disconnects and the circuit breaker CB are actuated and the conductors L1, L2 and L3 are connected to the power supply. In addition, the primary AP of the transformer AT is supplied with potential. The push button BPB being open, the contactor M is deenergized and the motor AM is deenergized, so that the exciters E1 and EB supply no potential. Conductors DL1 and DL2 are then deenergized. Contactors 2H and 2L are also deenergized and their contacts in series with conductors L1, L2 and L3 are open. The motors M1 and M2 are then deenergized and relays H11 and H12 are deenergized. Further, contactor 1HL is deenergized and its contacts in series with motor M1 open.

The brake solenoid SO is deenergized since relay LV is deenergized and its contact 62 is open. The brake is then applied to the motors M1 and M2. There is no potential across tachometer TK.

In the Dynamic Brake Unit the exciter EB is disconnected from motor M1 since the relay 1B is deenergized and its contacts are open. The primary DP of the differentiating transformer DT is disconnected from the tachometer TK since the relays HS and LS are deenergized. Since relay SS is deenergized, the tachometer is adapted to be connected across the primary DP and the secondary DS is connected to the main input winding of the amplifier DA. The tachometer is also adapted to be connected to the input winding of the amplifier SA. Since the tachometer TK has no potential, the amplifiers DA and SA and the relay OS are deenergized.

The relay AU is deenergized as are also the relays UD, CR and SS. The relays 1A1 through 6A2 are deenergized and the resistance in series with the armatures of the motors M1 and M2 is at a maximum. The relays 3T, 4T and 6T are deenergized because the conductors ADL1 and DL2 are deenergized, but these relays are adapted to be energized when power is supplied to conductors ADL1 and DL2.

To prepare the apparatus, the pushbutton BPB is closed, energizing contactor M and locking it in the energized condition through the contact 147. The actuation of contactor M closes the contacts 141, 143, 145 in series with the motor AM and the motor is energized from the secondary AS, energizing the exciters E1 and EB. The exciter E1 supplies potential to the conductors DL1 and DL2. The contact 213 of the contactor M in series with coil LV is now closed, the relay LV is actuated. When relay LV is actuated, its normally open contacts 217 and 215 are closed, energizing conductor ADL1 and locking the relay LV in the closed position. The potential is now present between conductors ADL1 and DL2 and relays 3T, 4T and 6T are energized and their normally open contacts 327, 329 and 331 in series with the coils of relays 3A1, 5A1 and 6A1 are opened. In addition, contact 62 is closed causing the brake solenoid SO to be energized and the drum brake to be released from the motors M1 and M2. With the drum brake released the operator may brake the motors M1 and M2 with a hand brake (not shown).

Automatic operation

When the apparatus is to be set into automatic operation, the pushbutton BMA is set in the automatic position so that the circuit through the relay AU is closed and relay AU is actuated. The load may now be raised or lowered by actuation of pushbutton HPB or LPB.

With the load in either of its extreme positions the limit switches BLS1 and TLS1 are open and BLS4 and TLS4 are closed. The condition of the other limit switches depends on the position of the load. Assume that the load is in the lower position. Under such circumstances switch BLS2 is open and TLS2 is closed. Switch BLS3 is open and switch TLS3 is closed. The circuits through relays U and UD are then adapted to be closed by actuation of button HPB while the circuit through the coil of relay D cannot be closed. The circuit through the coil of relay CR can be closed by actuation of relays U and AU. To raise the load, the button HPB is closed and relays U and UD are energized. Relays U and UD are actuated and locked in through contact 225 of relay U. The actuation of the relay U opens the normally closed contact 233 in series with the relay D, preventing its accidental actuation. In addition, the normally open contact 227 in series with the coil of relay CR is closed and since the limit switch TLS2 is closed, relay CR is actuated (contact 223 being closed). The actuation of relay U closes the normally open contact 231 in series with the coil of contactor 2H and this coil is energized (in a circuit including ADL1, 231, 270, 387, 2H, 133, DL2) and locked in independently of contact 133 through one of its normally open contacts 111. In addition, the coil of contactor 1HL is energized (in a circuit including ADL1, 229, 1HL, 129, 259, 269, DL2) and locked in independently of contact 129 by contact 127. The actuation of contactor 2H closes contacts 71, 73 and 75, and the actuation of contactor 1HL closes contacts 91, 93, 95 and conductors L1, L2 and L3 are connected directly to the motor M2; and through contacts 91, 93, 95 to motor M1.

Figure 2:
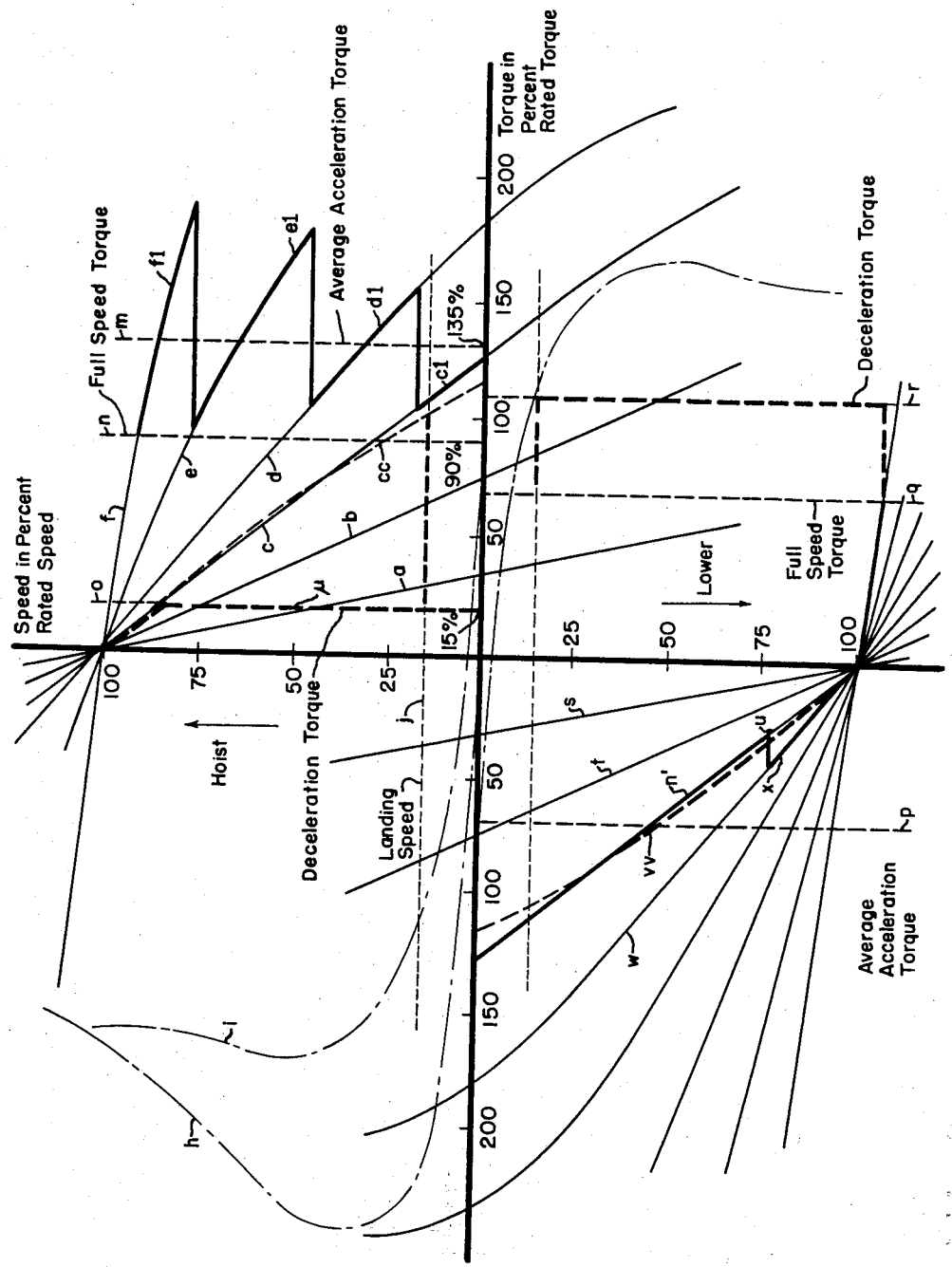
Fig. 2 is a torque-speed graph illustrating the operation of the apparatus shown in Figs. 1A through 1C.

Motors M1 and M2 are then energized and start to rotate. The relationship between the speed at which the load is moved and the torque exerted by the motors is presented in Fig. 2. In this graph speed of the load or drive shaft in percent of rated speed (of the motors M1 and M2) is plotted vertically and torque in percent of rated torque of both motors (except for curves cc, h, i, vv) is plotted horizontally. Where the motors M1 and M2 are alike the rated torque of both motors is twice the rated torque of either. The motors M1 and M2 may be different within the scope of this invention and in this case the rated torque of both motors is equal to the sum of the rated torques of the motors. It may be assumed that the raising of the load corresponds to the operation in the upper right-hand quadrant of Fig. 2. The light-line curves of Fig. 2 represent the torque speed characteristics for different settings of the resistances 1R1 through 6R2 in the motor armature circuits. Initially the operation corresponds to the curve *a* in the extreme left of this quadrant. In this condition, a relatively low torque (insufficient to raise a load of moderate weight) is being exerted by the motors M1 and M2 but the motors do not remain in this condition.

Since the contactor 2H and relay UD are actuated, the normally open contacts 113, 115 and 251 in series with the relays 1A1 and 1A2 are closed, and these are actuated. The actuation of these relays closes contacts 21, 23, 41, 43 shorting out the resistances 1R1 and 1R2 in circuit with the armatures of motors M1 and M2. The curve *b* to the right of curve *a* now becomes the speed-torque characteristic of the motors. It may be assumed that in this case again the torque is inadequate to raise the load. But the actuation of relays 1A1 and 1A2 closes normally open contacts 293 and 295 in circuit with the coils of relays 2A1 and 2A2 and since the normally open contact 249 of relay UD in series with these contacts 293 and 295 is also closed, relays 2A1 and 2A2 are actuated, further reducing the resistance (by cutting out 2R1 and 2R2) in the armature circuits of motors M1 and M2 so that the armature characteristic is the curve *c* to the right of curve *b*. With the characteristics of the motors M1 and M2 corresponding to the curve *c*, the torque at zero speed is sufficient to move the load and the load is moved along the characteristic as represented by the heavy portion *c1* of the curve. The actuation of relays 2A1 and 2A2 opens the circuit through the coil of relay 3T, deenergizing this relay. After a predetermined time interval, the normally closed contact 327 of this relay recloses. At this time the normally open contacts 297 and 309 of relays 2A1 and 2A2 in circuit with the coils of relays 3A1 and 3A2 are closed as is also the normally open contact 247 of relay UD and relays 3A1 and 3A2 are actuated. Resistances 3R1 and 3R2 are now cut out and the characteristic of the motors is now given by the fourth curve *d* on the right and the speed of the load is increased as represented by the heavy portion *d1* of this curve. The actuation of relays 3A1 and 3A2 opens the contacts 305 and 317 in series with the timing relay 5T, deenergizing this relay; after a time interval the contact 329 in series with the coil of relay 5A1 is closed. Since the contacts 299 and 311 of relays 3A1 and 3A2 are now closed, relays 5A1 and 5A2 are actuated, further changing the characteristic of the motor so that it is now presented by curve *e*. The speed of the load is now increased as represented by the heavy portion *e1* of this characteristic. Next the relay 6T is deenergized by the opening of the contacts 307 and 319 of 5A1 and 5A2 and the resistance is entirely eliminated from the armature circuits by the closing of contacts 37 and 39 and 57 and 59 so that the characteristic of the motors M1 and M2 is as represented by the highest curve *f* and the speed at which the load is raised is approximately at 100% rated speed or synchronous speed. The load is now raised at this maximum speed.

Figure 6:
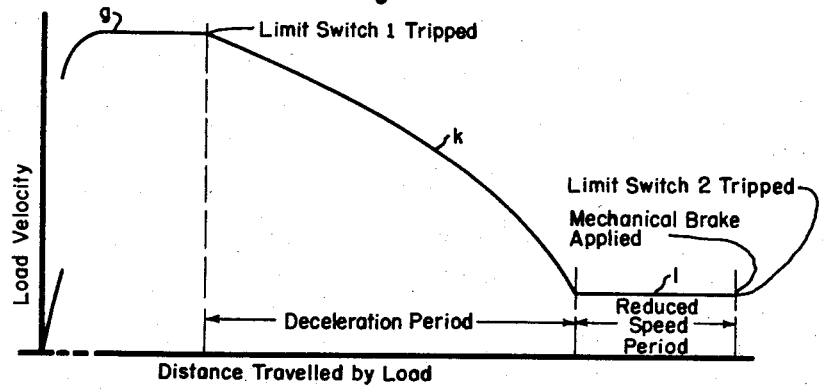
Fig. 6 is a graph showing the relationship between the load speed and the distance over which the load travels.

The speed of the load as a function of the distance over which it is moved is represented by Fig. 6 in which the load speed is plotted vertically and the distance traveled by the load horizontally. The movement under consideration up to now is represented by the portion of the curve *g* on the left which uses from zero speed and remains substantially parallel to the distance axis.

As a result of the movement of the load from the bottom position, limit switches BLS2 and BLS3 are reset. This has no effect on the operation.

The movement now continues until the load approaches the intermediate position at which the speed is to be reduced to the landing speed. At this point the limit switch TLS1 is instantaneously actuated, energizing the relays HS and R (through 281). These relays are locked in, independently of TLS1, through contact 265 of relay HS. The actuation of the relay R opens its normally closed contacts 285 and 287 in series with the coils of the relays 5A2 and 6A1, so the relays 5A2, 6A1, 6A2 drop out and resistances 5R2 and 6R2 are introduced in the armature circuit of motor M2. The increase in resistance has the effect of shifting the operating characteristics of the motors from curve *f* on the right to a curve (not shown) in the region between the curves *d—e*. In addition, the actuation of relay HS has the effect of causing its contacts 260 and 259 in series with the coils of contactors 2L and 1HL to open. In addition, the contact 261 in series with the relay UD is closed and relay UD is locked in independently of the circuit including relay U.

The opening of the contact 260 in series with the coil of contactor 2L has no effect. The opening of the contact in series with the coil of contactor 1HL deenergizes the latter and causes the contacts 91, 93, 95 in series with motor M1 to be opened and the supply of power to motor M1 to be interrupted.

Torque is now applied only by one motor M2. The torque of this motor M2 plotted in Fig. 2 may be considered in percent of the rated torque of the two motors M1 and M2 and the speed torque characteristic of this motor M2 may be represented by the broken line *c—c*.

Further, contacts 171 and 173 of HS in series with the tachometer TK and the primary DP of the differentiating transformer DT are closed and the tachometer is connected through the differentiating transformer to the main input windings 151 of the magnetic amplifier DA. The tachometer TK is also connected to the input winding of the magnetic amplifier SA through the now closed contacts of relay HS.

The contact 263 of relay HS in series with the coil of relay 1B also closes but this has no effect until contactor 1HL is deenergized since relay H11 remains actuated and its contact 131 remains open. But when 1HL is deenergized and the supply of power to motor M1 is interrupted the supply of potential to transformer AT1 is interrupted and relay H11 is deenergized and drops out. This recloses the contact 131 in series with the brake relay 1B and the relay is actuated, connecting the braking exciter EB to the motor M1 through contacts 144 and 146 and applying dynamic braking. In addition, contact 129 is reclosed resetting contactor 1HL for another operation, which is now being prevented because contact 259 of relay HS is open.

The magnitude of the braking applied to the motor M1 is determined by the current flowing through the field winding 143 of the exciter EB and this in turn depends on the outputs of the amplifiers DA and SA. The output of the amplifier DA is determined by the supply of current to the pattern setting winding 155. This is counteracted by the control current transmitted through the main input winding 151 which in turn is proportional to the deceleration of the load. Since initially this deceleration is low, the effect of the pattern winding predominates and the current which would be supplied to the exciter field in the absence of current through the auxiliary winding 153 would be high (see Figs. 3 and 4). The winding 153 is supplied from the amplifier SA and since the load speed is high initially, the output of the amplifier SA is initially low (see Fig. 4). The field of the pattern setting winding 155 then predominates and the supply of field current to the exciter EB is high and the braking torque applied by the exciter is initially high and the load is decelerated.

Figure 5:
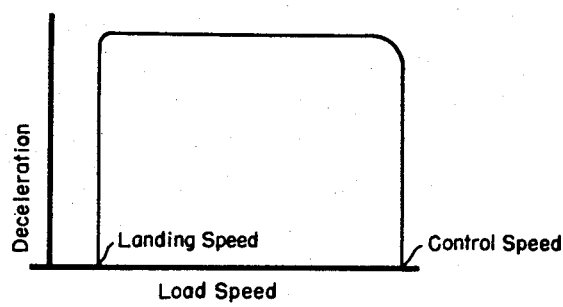
Fig. 5 is a graph showing the relationship between the speed of the load and the deceleration rate.

The effect of the pattern setting winding 155 is modified by the effect produced by the main control winding 151 as the speed of the load changes, but so long as the speed remains above the landing speed, the amplifier SA (the auxiliary winding 153) has substantially negligible effect. Thus for speeds above the landing speed the braking torque is regulated by the cooperation of the tachometer TK, the differentiating transformer DT, the amplifier DA and the exciter EB. The variation of the deceleration as a function of load speed is shown in Fig. 5 in which deceleration is plotted vertically and load speed horizontally. It is seen that the deceleration remains substantially constant between the initial (running) speed and the landing speed.

The torque speed characteristic of the braking exciter in this condition of the apparatus is illustrated in the upper left-hand quadrant of Fig. 2. In this case the braking torque of motor M1 is plotted in percent of the total rated torque of both motors. The two loops $h$ and $i$ in the upper portion of this quadrant are characteristics for the braking exciter EB corresponding to different settings of the current supplied to the pattern setting winding 155. The net effect produced on the load by the application of the dynamic braking by the exciter EB is determined by the difference between the torque exerted by motor M2, the torque speed characteristic of which is represented by a curve in the right hand upper quadrant and the selected torque speed characteristic of the brake EB. The load speed will then decrease along a curve intermediate the braking characteristic curve $h$ or $i$ and the speed torque curve of the drive. This decrease continues until the speed of the load is reduced to the landing speed $(j)$.

At this point the current supplied to the bias winding of the amplifier SA predominates (Fig. 3) and the current flow through the field 142 of the exciter EB is dependent primarily on the speed of the load rather than on its deceleration. The effect of the output of the amplifier SA on the exciter is to counteract variations in the speed of the load and to maintain the speed substantially constant at the landing speed.

The operation just discussed is illustrated graphically in Fig. 6 by the portions $k$ and $l$ of the curve. The load continues to be moved at the constant landing speed until it reaches the landing position. At this point the limit switches TLS2 and TLS3 are opened. The relays CR and U are then deenergized.

The deenergization of relay CR causes its contact 66 in series with the brake solenoid to open and the brake solenoid to be deenergized (since 64 is now open) so that the drum brake is applied. Since at this time the load speed is substantially zero, the brake is not damaged by contacting the drum BD. The deenergization of relay CR also opens contact 281 deenergizing relays R and HS and by the resulting opening of contacts 261 and 263 deenergizing UD and 1B.

The deenergization of the relay U causes its normally open contacts 231 in series with the coil of contactor 2H to open so that this contactor is deenergized, opening the supply circuit both to motor M2 and to motor M1. The deenergization of relay 1B disconnects the exciter EB from the motor M1 and the deenergization of relay UD resets relays 1A1, 1A2, 2A1, 2A2, 3A1, 3A2 and 5A1. Relays 3T, 5T and 6T are now again energized. The apparatus is now reset for a lowering operation which may be carried out by actuating pushbutton LPB.

The lines $m$, $n$, and $o$ in the upper right hand quadrant of Fig. 2 correspond to torque magnitudes having the effects labeled on Fig. 2 for the load raised. The torque of approximately 135% of line $m$ is sufficient to impart to the load its average acceleration; the torque of approximately 90% of line $n$ is just sufficient to maintain the load at full speed; and the torque of about 15% of line $o$ is such as to give the load the desired deceleration. It is to be noted that a positive (hoisting torque) is required to decelerate the load. The lower left hand quadrant presents the situation during lowering. In this case lines $p$, $q$, $r$ correspond respectively to $m$, $n$, $o$.

If during the hoisting operation one of the relays, for example, the relay CR or the relay U sticks, the load may overrun. Under such circumstances limit switch TLS4 would open, deenergizing relay LV. The opening of the normally open contact 217 of relay LV would then interrupt the connection between conductors DL1 and ADL1, thus interrupting the supply of current to the contactors 2H and 1HL. Further, the opening of the normally open contact 62 of relay LV in series with the brake solenoid SO would assure deenergization of the brake solenoid and the drum brake BD would be applied to the motors M1 and M2. The drive would then be deenergized and the load would stop at the position where thet hoist overrun limit switch TLS4 is open.

To return the load to its proper upper position the backout switch BDR is turned in the "lower" direction. Under such circumstances an auxiliary circuit is provided through the coil of the relay LV which includes normally open contacts 383 of the backout switch. The relay LV may now be reenergized by closing the reset pushbutton BR. The relay LV is then actuated, locking itself in through its normally closed contact 217 and applying power to the solenoid SO to release the drum brake. In addition, power is again supplied to conductor ADL1, and relay AU is actuated. To return the load to its proper top position, the button LPB is actuated energizing relay D (through 233, BLS3, UD, 223). The coil of contactor 2L is now energized (through ADL1, 241, 260, 389, 133) and the coil of contactor 1HL (through ADL1, 239, 129, 259, 269) and power is supplied to motors M1 and M2 to return the load. Switch TLS4 now recloses and the backout switch may be returned to its neutral position.

*Operation—Manual*

It may be assumed that at the start of the manual operation the load is in the top position to which it was returned as described above. With the load in this position the limit switches BLS1 and TLS1 are open, limit switch BLS2 is closed and limit switch TLS2 is opened, limit switch BLS3 is closed and limit switch TLS3 is opened. Limit switches TLS4 and BLS4 are closed.

Preparatory to the operation, the pushbutton BMA is set to manual and the pushbutton BPB is closed so that the motor AM is energized and there is potential between the conductors DL1 and DL2. Further, the normally closed contacts 64, 219, 221 of the relay AU are closed and since the contacts of the circuit breaker CB and of the contactor M are also closed, the relay LV is actuated. The actuation of the relay LV supplies current through the brake solenoid SO and releases the drum brake. In addition, through contact 217 of the relay LV power is supplied to conductor ADL1 and through 217 and 221 to ADL2 and ADL3. The apparatus is now ready for operation.

To lower the load the master controller is now moved to the first lower position. The normally closed neutral contact 361 of the master controller is now open, but relay LV remains locked in through its normally closed contact 217.

The setting of the master controller in lower position 1 connects the coil of the contactor 2L (through 133, 389, 260, 345) and the coil of the contactor 1HL (269, 259, 129, 347) between conductors DL2 and ADL2, actuating these contactors. Power is then supplied to the motors M1 and M2 in a direction so as to lower the load. In addition, the relays 1A1 and 1A2 are conditioned to be energized by the closing of contacts 123 and 125 or 2L in their coil circuits. At this point the characteristic of load is curve $s$ in the lower left hand quadrant of Fig. 2 and the torque is inadequate to move the load.

The master controller may now be moved to position 2. At this point relays 1A1 and 1A2 are actuated, reducing the resistance in circuit with the armatures of the motors M1 and M2. The load torque characteristic of the motor is now represented by curve $t$ of Fig. 2. The actuation of relays 1A1 and 1A2 causes their normally open contacts 293 and 295 in series with the coils of relays 2A1 and 2A2 to close and these relays are now conditioned to be actuated. The master controller may now be moved to lower position 3 actuating the relays 2A1 and 2A2, the resistance in the armature circuit of motors M1 and M2 is now further reduced so that the characteristic is curve $u$ of Fig. 2 and the load is now moved, its speed increasing as represented by the heavy portion $n'$ of curve $u$. In addition, relay 3T is deenergized. Since the normally open contacts 297 and 309 and 353 in series with the coils of relays 3A1 and 3A2 are now closed, the resistance in the armature circuits of motors M1 and M2 may be further reduced by actuation of relays 3A1 and 3A2. The characteristic curve is now $w$ of Fig. 2 and the speed increase of the load is now represented by the heavy portion $x$ of curve $w$. As can be seen, the motors M1 and M2 are operating at 100% speed with the controller in position 3. It is not then necessary to move the controller MDR to higher speed positions. If such operation were necessary further resistance could be removed from the armature circuits by moving the controller.

The movement of the load may now continue with the motors M1 and M2 at rated speed. If the speed should become excessive the potential impressed across the coil of the relay OS by the tachometer TK would become adequate to actuate the relay OS. Its normally open contacts 321, 323, 325 in series with the coils of relays 3A1, 3A2, 5A1, 5A2 and 6A1, 6A2 would then close, actuating these relays and reducing the resistance in the armature circuits of motors M1 and M2 to a relatively low magnitude so that the motors would tend to pull into synchronous speed and to reduce the speed of the load. The relay OS would then be deenergized and the load would continue at the normal speed.

The movement of the load would then continue under the control of the master controller until it reaches the lower position. If it is desirable at any point to reduce the speed, the master controller may be returned to lower position 2 or lower position 1 so that the speed of the motors is reduced. The actuation of the limit switches BLS1 has no effect on the movement of the load when set for manual control because relay CR is unactuated and its contact 283 in series with the relay LS is maintained open.

*Operation—Slow speed*

When the apparatus is to be inspected it is desirable that the load be operated at a low speed. Under such circumstances the manual automatic button MBA is set for automatic, after the contactor M is actuated, and the slow speed button BSS is closed to the slow speed position. The relay SS is then energized, opening the connection between the tachometer TK and the input winding 161 of the amplifier SA and conditioning the direct connection between the tachometer TK and the main input winding 151 of the amplifier DA to be closed (through 201 and 203). In addition, the normally open contacts 256 and 257 connected to the limit switches BLS1 and TLS1 are closed. Depending on the position of the load the pushbutton HPB or LPB may now be actuated. Assume that the load is in the lower position. Under such circumstances the pushbutton HPB is actuated, energizing relays U and UD and relay CR.

The actuation of relay U causes contactor 2H to be actuated and power is supplied to the motor M2. The actuation of relays UD and CR causes relay HS to be actuated (through 256, 253, 281). This prevents actuation of relay 1HL so that the supply circuit to motor M1 remains open. In addition, the actuation of relay HS closes its normally open contact 263 in series with the coil of relay 1B, actuating this relay and connecting the exciter EB to motor M1. The actuation of relay HS also causes the normally open contacts 171 and 173 between the tachometer TK and the main input winding 151 of the amplifier DA to be closed. A signal proportional to the speed of the load is now applied to the main input winding 151 and a corresponding current is impressed on the field of the exciter EB. The effect of the tachometer signal on the exciter EB is to maintain the speed at a low magnitude (Fig. 3). The load then is slowly raised and may be effectively inspected.

*Conclusion*

It is seen that novel apparatus particularly suitable for a mine hoist drive is provided in accordance with this invention. In the operation of this apparatus the speed of the load is quickly reduced to the landing speed when the load approaches the landing position. This is effected by increasing the resistance in the armature circuit of one of the motors (M2) of the drive unit, disconnecting the other motor (M1) from the supply and applying dynamic braking to the latter, the effectiveness of the dynamic braking being controlled initially to maintain the deceleration of the load constant and finally to maintain the speed of the load constant.

While a preferred embodiment of this invention has been disclosed herein, many modifications thereof are feasible. The invention therefore is not to be restricted except insofar as is necessitated by the spirit of the prior art.

I claim as my invention:

1. The method of operating apparatus for moving a load from an initial position to a final position, said apparatus including power supply means, a first motor and a second motor connected to said load and dynamic braking means adapted to be connected to said first motor, said method comprising connecting said first and second motors to said supply means with said braking means disconnected from said first motor to energize said first and second motors so that said motors move said load from said initial position to an intermediate position and when said load reaches said intermediate position disconnecting said first motor from said supply means and connecting said braking means to said first motor to reduce the speed at which said load reaches said final position.

2. The method of moving a load from an initial position to a final position with drive apparatus including power supply means, a first motor, dynamic braking means adapted to be connected to said first motor to apply braking power thereto, a second motor having a field circuit and an armature circuit, variable resistance means connected to said last-named armature circuit for varying the resistance thereof, the first and second motors being in driving engagement with said load, the said method comprising connecting said first and said second motors to said supply means with said braking means disconnected from said first motor to start movement of said load from said initial position to said final position, setting said resistance means with the resistance in the armature circuit of said second motor at a predetermined magnitude so that the load moves at the desired rate from said initial position to a predetermined intermediate position, and when said load reaches said intermediate position increasing the resistance in the armature circuit of said second motor, disconnecting said first motor from said supply means and connecting said braking means to said first motor, to reduce the speed at which said load reaches said final position.

3. Apparatus adapted to be energized from a power supply source to move a load from an initial position to a final position comprising in combination a first motor having field winding means and armature winding means, a second motor having field winding means and armature winding means, means for connecting said armature winding means of both said motors in tandem to said load to drive said load, first variable resistance means connected to said first armature means, second variable resistance means connected to said second armature means, first means for connecting said field winding means of said first motor to said source, second means for connecting said field winding means of said second motor to said source, a tachometer, means connecting said tachometer to said in-tandem connecting means so that said tachometer when so connected produces a potential dependent on the speed of said armature winding means, a differentiating transformer having a primary and a secondary, a first magnetic amplifier means including control winding means, pattern winding means, auxiliary winding means, and output winding means, second amplifier means including control winding means, bias winding means, and output winding means, dynamic braking means, means connecting said secondary to said control winding means of said first amplifier means, means connected to said pattern winding means for supplying to said pattern winding means current corresponding to speed pattern which said load is to follow when moved, means connecting said output winding means of said second amplifier means to said auxiliary winding means, means connected to said bias winding means for supplying a bias current thereto, means connecting said output winding means of said first amplifier means to said braking means, first means responsive to said load when it reaches a predetermined position and connected to said second connecting means for disconnecting said source from said field winding means of said first motor, second means responsive to said load when it reaches said predetermined position connected to said first resistance means for increasing the resistance connected to the armature winding means of said second motor, third means responsive to said load when it reaches said predetermined position connected to said tachometer and said primary for connecting said tachometer to said primary, fourth means responsive to said load when it reaches said predetermined position connected to said tachometer and said input winding means of said first amplifier means for connecting said tachometer means to said last-named input winding means, and means responsive to the disconnection of said field winding means of said first motor from said source and connected to said braking means for connecting said braking means to said first motor, said first amplifier means being so related to said second amplifier means that the output of said second amplifier means is determined substantially only by the output of said first amplifier means for speeds of said armature winding means which are below a predetermined speed and the output of said first amplifier means is independent of the output of said second amplifier means for speeds of said armature winding means above said predetermined speed.

4. Apparatus adapted to be energized from a power supply source to move a load from an initial position to a final position comprising in combination a first motor having field winding means and armature winding means, a second motor having field winding means and armature winding means, means for connecting said armature winding means of both said motors in tandem to said load to drive said load, first variable resistance means connected to said first armature means, second variable resistance means connected to said second armature means, first means for connecting said field winding means of said first motor to said source, second means for connecting said field winding means of said second motor to said source, a tachometer, means connecting said tachometer to said in-tandem connecting means so that said tachometer when so connected produces a potential dependent on the speed of said armature winding means, a differentiating transformer having a primary and a secondary, a first magnetic amplifier means including control winding means, pattern winding means, auxiliary winding means, and output winding means, second amplifier means including control winding means, bias winding means, and output winding means, dynamic braking means, means connecting said secondary to said control winding means of said first amplifier means, means connected to said pattern winding means for supplying to said pattern winding means current corresponding to speed pattern which said load is to follow when moved, means connecting said output winding means of said second amplifier means to said auxiliary winding means, means connected to said bias winding means for supplying a bias current thereto, means connecting said output winding means of said first amplifier means to said braking means, first means responsive to said load when it reaches a predetermined position and connected to said second connecting means for disconnecting said source from said field winding means of said first motor, second means responsive to said load when it reaches said predetermined position connected to said first resistance means for increasing the resistance connected to the armature winding means of said second motor, third means responsive to said load when it reaches said predetermined position connected to said tachometer and said primary for connecting said tachometer to said primary, fourth means responsive to said load when it reaches said predetermined position connected to said tachometer and said input winding means of said first amplifier means for connecting said tachometer means to said last-named input winding means, and means responsive to the disconnection of said field winding means of said first motor from said source connected to said braking means for connecting said braking means to said first motor.

5. Apparatus adapted to be energized from a power supply source to move a load from an initial position to a final position comprising in combination a first motor having field winding means and armature winding means, a second motor having field winding means and armature winding means, means for connecting said armature winding means of both said motors in tandem to said load to drive said load, first variable resistance means connected to said first armature means, second variable resistance means connected to said second armature means, first means for connecting said field winding means of said first motor to said source, second means for connecting said field winding means of said second motor to said source, a tachometer, means connecting said tachometer to said in-tandem connecting means so that said tachometer when so connected produces a potential dependent on the speed of said armature winding means, a differentiating transformer having a primary and a secondary, a first magnetic amplifier means including control winding means, pattern winding means, auxiliary winding means, and output winding means, second amplifier means including control winding means, bias winding means, and output winding means, dynamic braking means, means connecting said secondary to said control winding means of said first amplifier means, means connected to said pattern winding means for supplying to said pattern winding means current corresponding to speed pattern which said load is to follow when moved, means connecting said output winding means of said second amplifier means to said auxiliary winding means, means connected to said bias winding means for supplying a bias current thereto, means connecting said output winding means of said first amplifier means to said braking means, first means responsive to said load when it reaches a predetermined position and connected to said second connecting means for disconnecting said source from said field winding means of said first motor, third means responsive to said load when it reaches said predetermined position connected to said tachometer and said primary for connecting said tachometer to said primary, fourth means responsive to said load when it reaches said predetermined position connected to said tachometer and said input winding means of said first amplifier means for connecting said tachometer means to said last-named input winding means, and means responsive to the disconnection of said field winding means of said first motor from said source connected to said braking means for connecting said braking means to said first motor.

6. Apparatus adapted to be energized from a power supply source to move a load from an initial position to a final position comprising in combination a first motor, a second motor, means for connecting both said motors in tandem to said load to drive said load, first means for connecting said first motor to said source, second means for connecting said second motor to said source, a tachometer, means connecting said tachometer to said in-tandem connecting means so that said tachometer when so connected produces a potential dependent on the speed of said armature winding means, a differentiating transformer having a primary and a secondary, first magnetic amplifier means including control winding means, pattern winding means, auxiliary winding means, and output winding means, second amplifier means including control winding means, bias winding means, and output winding means, dynamic braking means, means connecting said secondary to said control winding means of said first amplifier means, means connected to said pattern winding means for supplying to said pattern winding means current corresponding to speed pattern which said load is to follow when moved, means connecting said output winding means of said second amplifier means to said auxiliary winding means, means connected to said bias winding means for supplying a bias current thereto, means connecting said output winding means of said first amplifier means to said braking means, first means responsive to said load when it reaches a predetermined position and connected to said second connecting means for disconnecting said source from said first motor, third means responsive to said load when it reaches said predetermined position connected to said tachometer and said primary for connecting said tachometer to said primary, fourth means responsive to said load when it reaches said predetermined position connected to said tachometer and said input winding means of said first amplifier means for connecting said tachometer to said last-named input winding means, and means responsive to the disconnection of said first motor from said source connected to said braking means for connecting said braking means to said first motor.

7. Apparatus adapted to be energized from a power supply source to move a load from an initial position to a final position comprising in combination a first motor having an armature, a second motor having an armature, means connecting said motors in tandem to said load to drive said load from said initial position to said final position, first means for connecting said first motor to said source, second means for connecting said second motor to said source, means connected to said armatures for producing a potential dependent on the speed of said armatures, dynamic braking means, means connected to said braking means for varying the braking effect thereof, means adapted to respond to said potential producing when connected thereto and connected to said varying means for varying the braking effect of said braking means in inverse dependence upon the deceleration of said armatures until said load reaches a predetermined landing speed and for thereafter varying the braking effect of said braking means in dependence upon the speed of said armatures to maintain said load at said landing speed, first means responsive to said load when it reaches an intermediate position between said initial position and said final position and connected to said first connecting means for disconnecting said first motor from said source when said load reaches said intermediate position, second means responsive to said load when it reaches said intermediate position connected to said potential producing means for connecting said potential producing means to said means adapted to respond to said potential producing means, and means responsive to the disconnection of said first motor from said source connected to said braking means for connecting said braking means to said first motor.

8. Apparatus adapted to be energized from a power supply source to move a load from an initial position to a final position comprising in combination a first motor having an armature, a second motor having an armature, means connecting said motors in tandem to said load to drive said load from said initial position to said final position, first means for connecting said first motor to said source, second means for connecting said second motor to said source, means connected to said armatures for producing a potential dependent on the speed of said armatures, dynamic braking means, means connected to said braking means for varying the braking effect thereof, means responsive to said potential producing when connected thereto and connected to said varying means for varying the braking effect of said braking means in dependence upon the speed of said armatures to maintain said load at said landing speed, first means responsive to said load when it reaches an intermediate position between said initial position and said final position and connected to said first connecting means for disconnecting said first motor from said source when said load reaches said intermediate position, and means responsive to the disconnection of said first motor from said source connected to said braking means for connecting said braking means to said first motor.

9. Apparatus adapted to be energized from a power supply source to move a load from an initial position to a final position comprising in combination a first motor having an armature, a second motor having an armature, variable resistance means connected in circuit with said armature, means connecting said motors in tandem to said load to drive said load from said initial position to said final position, first means for connecting said first motor to said source, second means for connecting said second motor to said source, means connected to said armatures for producing a potential dependent on the speed of said armatures, dynamic braking means, means connected to said braking means for varying the braking effect thereof, means responsive to said potential producing when connected thereto and connected to said varying means for varying the braking effect of said braking means in inverse dependence upon the deceleration of said armatures until said load reaches a predetermined landing speed and for thereafter varying the braking effect of said braking means in dependence upon the speed of said armatures to maintain said load at said landing speed, first means responsive to said load when it reaches an intermediate position between said initial position and said final position and connected to said first connecting means for disconnecting said first motor from said source when said load reaches said intermediate position, means connected to said resistance means for maintaining said resistance means at a lower magnitude when said load is between said initial position and said intermediate position, second means responsive to said load when it reaches said intermediate position and connected to said resistance means for increasing the resistance means to a higher magnitude, and means responsive to the disconnection of said first motor from said source connected to said braking means for connecting said braking means to said first motor.

10. In combination, means for supplying an input signal potential, differentiating means having input means connected to said signal potential supply means and output means for deriving a signal potential which is proportional to the differential of the input signal potential, a first magnetic amplifier having a main input winding means, an output winding means and an auxiliary input winding means, means connecting said output means to said main input winding means, utilization means connected to said output winding means, a second magnetic amplifier having input winding means and output winding means, means connecting said potential signal supply means to said input winding means of said second amplifier, and means connecting said output winding means of said second amplifier to said auxiliary input winding means.

11. In combination, means for supplying an input signal potential, differentiating means having input means connected to said signal potential supply means and output means for deriving a signal potential which is proportional to the differential of the input signal potential, a first magnetic amplifier having a main input winding means, an output winding means and an auxiliary input winding means, means connecting said output means to said main input winding means, utilization means connected to said output winding means, a second magnetic amplifier having input winding means, bias winding means, and output winding means, means connecting said potential signal supply means to said input winding means of said second amplifier, means connected to said bias winding means for supplying biasing current to said second amplifier, and means connecting said output winding means of said second amplifier to said auxiliary input winding means, the operational characteristics of said amplifiers being so related that the differential signal derived from said differentiating means is overriding when said input signal potential is above a predetermined magnitude and said input signal potential is overriding when said input signal potential is below a predetermined magnitude.

12. In combination, a motor, braking means to be connected to said motor for reducing the speed thereof, means connected to said motor and to said braking means and responsive to the deceleration of said motor for varying the effect of said braking means when connected as aforesaid in inverse dependence on the deceleration of said motor until said motor reaches a predetermined speed, means connected to said motor and to said braking means and responsive to the speed of said motor for maintaining said motor at said predetermined speed once it is reached.

13. In combination, a motor, a magnetic amplifier having first input winding means, second input winding means, and output winding means, means connected to said motor and said first means for impressing on said first means a current dependent on the rate of change of speed of said motor and means connected to said motor and said second means for impressing on said second means a current dependent on the speed of said motor, both said impressing means being so related to said amplifier that the effect of said first winding is overriding so long as the speed of said motor is above a predetermined magnitude and said second means is overriding when the speed of said motor is below a predetermined magnitude.

14. The method of operating apparatus for moving a load from an initial position to a final position, said apparatus including power supply means, a first motor and a second motor connected to said load and variably energizable dynamic braking means adapted to be connected to said first motor, said method comprising connecting said first and second motors to said supply means with said braking means disconnected from said first motor to energize said first and second motors so that said motors move said load from said initial position to an intermediate position and when said load reaches said intermediate position disconnecting said first motor from said supply means and connecting said braking means to said first motor to reduce the speed at which said load reaches said final position, said braking means while so connected being so energized that after said load reaches said intermediate position its speed is reduced to a predetermined magnitude and remains at this magnitude until said load reaches said final position.

15. The method of operating apparatus for moving a load from an initial position to a final position, said apparatus including power supply means, a first motor and a second motor connected to said load and variably energizable dynamic braking means adapted to be connected to said first motor, said method comprising connecting said first and second motors to said supply means with said braking means disconnected from said first motor to energize said first and second motors so that said motors move said load from said initial position to an intermediate position and when said load reaches said intermediate position disconnecting said first motor from said supply means and connecting said braking means to said first motor to reduce the speed at which said load reaches said final position, said braking means while so connected being energized in dependence upon rate of change of said speed of said load after said load reaches said intermediate position until said speed is reduced to a predetermined magnitude and thereafter said braking means is energized in dependence upon said speed of said load to compensate for changes in speed and maintain said speed at said predetermined magnitude until said load reaches said final position.

16. In combination, a first motor, said first motor having a field winding, a second motor, means connecting said motors to operate in tandem, means connected to said motors responsive to the speed of said motors for generating a direct-current potential dependent on said speed, means connecting said generating means to said field winding to impress said potential on said field winding, power supply conductors, and means for selectively connecting either both said motors or only said second motor to said power supply conductors, whereby when only said second motor is connected to said power supply and said potential is impressed on said field winding said first motor exerts a drag on said second motor dependent on said speed.

17. The method of operating apparatus for moving a load, said apparatus including power supply means, a first motor and a second motor connected in tandem to said load and dynamic braking means connected to said motors and having an output dependent on the speed of said motors, the said method comprising connecting said second motor to said power supply means to energize said second motor, maintaining said first motor disconnected from said power supply means, impressing the output of said braking means on said first motor to brake said first motor in accordance with said ouput, and varying the output of said braking means so that the speed of said load is maintained at a constant magnitude.

18. In combination, conductors for supplying power, a motor, first means to be actuated for connecting and disconnecting said motor and said conductors, dynamic braking means, second means to be actuated for connecting and disconnecting said braking means and said motor, and interlock means between said first means and said second means connected to said motor and directly responsive to the potential existing across said motor for preventing said second means from being actuated to connect said braking means to said motor unless said first means is first actuated to disconnect said conductors from said motor.

References Cited in the file of this patent

UNITED STATES PATENTS

| 1,945,392 | Borden | Jan. 30, 1934 |
| 2,397,214 | Snyder | Mar. 26, 1946 |
| 2,583,301 | Mozzanini et al. | Jan. 22, 1952 |
| 2,683,246 | Priban | July 6, 1954 |
| 2,757,328 | Willby et al. | July 31, 1956 |
| 2,811,685 | Hoffer | Oct. 29, 1957 |

OTHER REFERENCES

A.I.E.E. Transactions Paper "A Two-Motor A.C. Mine Hoist Control System," Feb. 3, 1956, No. 56–84.